(12) United States Patent
Tripathi et al.

(10) Patent No.: US 11,544,304 B2
(45) Date of Patent: Jan. 3, 2023

(54) SYSTEM AND METHOD FOR PARSING USER QUERY

(71) Applicant: Innoplexus AG, Eschborn (DE)

(72) Inventors: Gaurav Tripathi, Pune (IN); Prashant Patil, Pune (IN); Rohit Kewalramani, Pune (IN); Dileep Dharma, Pune (IN); Vatsal Agarwal, Rampur (IN)

(73) Assignee: Innoplexus AG, Eschborn (DE)

( * ) Notice: Subject to any disclaimer, the term of this patent is extended or adjusted under 35 U.S.C. 154(b) by 211 days.

(21) Appl. No.: 16/366,396

(22) Filed: Mar. 27, 2019

(65) Prior Publication Data

US 2020/0089697 A1 Mar. 19, 2020

(30) Foreign Application Priority Data

Mar. 27, 2018 (GB) ...................................... 1804892

(51) Int. Cl.
*G06F 16/332* (2019.01)
*G06F 16/35* (2019.01)
*G06F 16/36* (2019.01)
*G06F 40/205* (2020.01)
*G06F 40/117* (2020.01)

(52) U.S. Cl.
CPC ........ *G06F 16/3329* (2019.01); *G06F 16/353* (2019.01); *G06F 16/367* (2019.01); *G06F 40/117* (2020.01); *G06F 40/205* (2020.01)

(58) Field of Classification Search
CPC .. G06F 16/3329; G06F 16/353; G06F 16/367; G06F 40/205; G06F 40/117
See application file for complete search history.

(56) References Cited

FOREIGN PATENT DOCUMENTS

WO    WO-2006031466 A2 *   3/2006   ............. G06F 40/40

OTHER PUBLICATIONS

Bird, Steven, et al. Natural Language Processing with Python: Analyzing Text with the Natural Language Toolkit. 1st ed., e-book, O'Reilly Media, 2009. pp. 1-2, 129-178, 261-290, 291-326, 361-406 (Year: 2009).*

* cited by examiner

*Primary Examiner* — William B Partridge
*Assistant Examiner* — Erich Alexander Fischer
(74) *Attorney, Agent, or Firm* — Ziegler IP Law Group, LLC (57) ABSTRACT

A system and a method for parsing a user query. The system includes a database arrangement operable to store an ontology; and a processing module communicably coupled to the database arrangement. The processing module operable to receive the user query; refine the user query to obtain a search query using an algorithm; generate a plurality of strings for the obtained search query; sort the plurality of strings in a decreasing order of length of the plurality of strings; assign a part-of-speech tag to each of the query segments of the plurality of strings based on the ontology; identify at least one of the query segments as at least one output class or at least one input class based on the assigned part-of-speech tags; and establish semantic associations between the query segments based on the ontology to obtain the parsed user query.

10 Claims, 2 Drawing Sheets

SYSTEM AND METHOD FOR PARSING USER QUERY

CROSS-REFERENCE TO RELATED APPLICATIONS

This application claims the benefit under 35 U.S.C. § 119(a) and 37 CFR § 1.55 to UK Patent Application No. GB1804892.6, filed on Mar. 27, 2018, the entire content of which is incorporated herein by reference.

TECHNICAL FIELD

The present disclosure relates generally to data processing; and more specifically, to systems that parses a user query. Furthermore, the present disclosure relates to methods for parsing a user query. Moreover, the present disclosure also relates to computer readable medium containing program instructions for execution on a computer system, which when executed by a computer, cause the computer to perform method steps for parsing the user query.

BACKGROUND

Generally, there is a lot of scope for research in advancing technological development in various fields. Specifically, research inspires innovation and promotes learning in community of scholars, scientists and inventors. Furthermore, there are number of available platforms which act as sources of information for researchers. Conventionally, printed media (such as books, encyclopaedias, and so forth) were a primary information source of knowledge and content. However, with advancements in technology, digital media has now replaced the printed media as an information source with easy accessibility and improved availability.

Typically, the digital media has a lot of data spread across various platforms. Consequently, existing search techniques require a lot of time and processing complexity for accessing contextually relevant data from these existing digital media platforms. In an example, a user performs search to obtain a user-specific content from information available on the digital media. Generally, the information available contains key terms related to the search of the user. In such a case, a frequency of the key terms present in the information allows for providing a desired search result to the user. However, in such a process, the context of usage of the key terms is not properly understood and thus there is always a risk of accessing non-relevant data. In addition, a skewed result reflecting only the current trend of key terms without considering the updated or refined versions is provided to the user.

Therefore, in light of the foregoing discussion, there exists a need to overcome the aforementioned drawbacks associated with the conventional method of searching context-based data.

SUMMARY

The present disclosure seeks to provide a system that parses a user query. The present disclosure seeks to provide a method for parsing a user query. The present disclosure also seeks to provide a computer readable medium, containing program instructions for execution on a computer system, which when executed by a computer, cause the computer to perform method steps for parsing a user query. The present disclosure seeks to provide a solution to the existing problem of contextually irrelevant, time consuming, inefficient searching techniques. An aim of the present disclosure is to provide a solution that overcomes at least partially the problems encountered in prior art, and provide a seamless, faster and optimized method for parsing the user query to understand contextual meaning thereof.

In first aspect, an embodiment of the present disclosure provides a system that parses a user query, wherein the system includes a computer system wherein the system comprises:
  a database arrangement operable to store an ontology; and
  a processing module communicably coupled to the database arrangement, the processing module operable to
    receive the user query from the user;
    refine the user query to obtain a search query using an algorithm, wherein the search query comprises query segments;
    generate a plurality of strings for the obtained search query, wherein the plurality of strings comprises at least one query segment;
    sort the plurality of strings in a decreasing order of length of the plurality of strings, wherein the length of a string corresponds to a number of query segments in the string;
    assign a part-of-speech tag to each of the query segments of the plurality of strings based on the ontology;
    identify at least one of the query segments as at least one output class or at least one input class based on the assigned part-of-speech tags; and
    establish semantic associations between the query segments based on the ontology to obtain the parsed user query.

In second aspect, an embodiment of the present disclosure provides a method for parsing a user query, wherein the method includes using a computer system, wherein the method comprises:
  receiving the user query;
  refining the user query to obtain a search query using an algorithm, wherein the search query comprises query segments;
  generating a plurality of strings for the obtained search query, wherein the plurality of strings comprises at least one query segment;
  sorting the plurality of strings in a decreasing order of length of the plurality of strings, wherein the length of a string corresponds to a number of query segments in the string;
  assigning a part-of-speech tag to each of the query segments of the plurality of strings based on an ontology;
  identifying at least one of the query segments as at least one output class or at least one input class based on the assigned part-of-speech tags; and
  establishing semantic associations between the query segments based on the ontology to obtain the parsed user query.

In third aspect, an embodiment of the present disclosure provides a computer readable medium, containing program instructions for execution on a computer system, which when executed by a computer, cause the computer to perform method steps for parsing a user query, the method comprising the steps of:
  receiving the user query;
  refining the user query to obtain a search query using an algorithm, wherein the search query comprises query segments;

generating a plurality of strings for the obtained search query, wherein the plurality of strings comprises at least one query segment;

sorting the plurality of strings in a decreasing order of length of the plurality of strings, wherein the length of a string corresponds to a number of query segments in the string;

assigning a part-of-speech tag to each of the query segments of the plurality of strings based on an ontology;

identifying at least one of the query segments as at least one output class or at least one input class based on the assigned part-of-speech tags; and establishing semantic associations between the query segments based on the ontology to obtain the parsed user query.

Embodiments of the present disclosure substantially eliminate or at least partially address the aforementioned problems in the prior art, and provides an efficient and reliable method and system parsing the user query to understand an accurate context of the user query.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

In overview, embodiments of the present disclosure are concerned with parsing a user query and specifically to, analysing semantics of segments of the user query.

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In first aspect, an embodiment of the present disclosure provides a system that parses a user query, wherein the system includes a computer system, wherein the system comprises:

a database arrangement operable to store an ontology; and a processing module communicably coupled to the database arrangement, the processing module operable to receive the user query from the user;

refine the user query to obtain a search query using an algorithm, wherein the search query comprises query segments;

generate a plurality of strings for the obtained search query, wherein the plurality of strings comprises at least one query segment;

sort the plurality of strings in a decreasing order of length of the plurality of strings, wherein the length of a string corresponds to a number of query segments in the string;

assign a part-of-speech tag to each of the query segments of the plurality of strings based on the ontology;

identify at least one of the query segments as at least one output class or at least one input class based on the assigned part-of-speech tags; and establish semantic associations between the query segments based on the ontology to obtain the parsed user query.

In second aspect, an embodiment of the present disclosure provides a method for parsing a user query, wherein the method includes using a computer system, wherein the method comprises:

receiving the user query;

refining the user query to obtain a search query using an algorithm, wherein the search query comprises query segments;

generating a plurality of strings for the obtained search query, wherein the plurality of strings comprises at least one query segment;

sorting the plurality of strings in a decreasing order of length of the plurality of strings, wherein the length of a string corresponds to a number of query segments in the string;

assigning a part-of-speech tag to each of the query segments of the plurality of strings based on an ontology;

identifying at least one of the query segments as at least one output class or at least one input class based on the assigned part-of-speech tags; and establishing semantic associations between the query segments based on the ontology to obtain the parsed user query.

The present disclosure seeks to provide a system and method for parsing the user query and enables efficient and reliable interpretation thereof. Beneficially, the present disclosure facilitates understanding of the intent and concepts of each query segments of the search query. In this regard, associations between the query segments are determined which aids to contextual analysis of the user query. Furthermore, the present disclosure allows for determining inter-relationships between the query segments. Such determination of the inter-relation allows for better comprehension of the user query and thereby enables an accurate and reliable search result.

Throughout the present disclosure, the term "user query" relates to a text provided by a user in order to extract relevant information therefrom. Moreover, the relevant information may be pertaining to a field of user's interest. Furthermore, the relevant information may comprise data related to one or more keywords of user query. Furthermore, the processing module is operable to receive a user query. Moreover, the processing module is operable to analyse the user query based on context of elements included therein. Additionally, optionally, the user query is in text format. Furthermore, the user query may be in an image or an audio format, wherein text is extracted therefrom. Optionally, the user query may be provided using a command prompt (cmd), user interface (UI) and so forth.

The computer system relates to at least one computing unit comprising a central storage system, processing units and various peripheral devices. Optionally, the computer system relates to an arrangement of interconnected computing units, wherein each computing unit in the computer system operates independently and may communicate with other external devices and other computing units in the computer system.

The term "system that parses" is used interchangeably with the term "system for parsing", wherever appropriate i.e. whenever one such term is used it also encompasses the other term.

Throughout the present disclosure, the term "processing module" used herein relates to a computational element that is operable to respond to and process instructions that carry out the method for parsing the user query. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, optionally, the processing module may refer to one or more individual processors, processing devices and various elements associated with a processing device that may be shared by other processing devices. Additionally, the one or more individual processors, processing devices and elements are arranged in various architectures for responding to and processing the instructions that drive the system.

Optionally, the processing module may be a computer-implemented module. More optionally, the user query may be provided by means of a graphical user interface (GUI), command line (cmd), drag and drop, and so forth to the processing module.

As mentioned previously, the method comprises refining the user query to obtain the search query using the algorithm, wherein the search query comprises query segments. Specifically, refining the user query relates to removing unwanted information (for example, such as punctuations) from the user query. Specifically, the processing module is configured to refine the user query to obtain the search query using the algorithm. The algorithm is stored in the processing module. In such a case, the processing module may comprise a memory unit for storing the algorithm therein. The algorithm is based on a predefined syntax. Optionally, the predefined syntax is defined by the user. The predefined syntax is used to split the text (namely, the user query) into multiple logical units. In an example, the user query may comprise "drugs, tablets for curing lung cancer". In such an example, the above-mentioned user query is refined to obtain the search query; wherein the search query comprises "drugs tablets for curing lung cancer" (punctuation is removed from the user query).

Throughout the present disclosure, the term "query segments" used herein relates to an element used to form the search query and typically written with a space on either side. It will be appreciated that the plurality of query segments constitutes for the search query. As mentioned in above example, the search query may read "drugs tablets for curing lung cancer". In such an example, the query segments are depicted as "drugs", "tablets", "for", "curing", "lung", and "cancer".

Optionally, the algorithm used in refining the user query comprises at least one of: natural language processing, text analytics and machine learning techniques. Furthermore, natural language processing, text analytics and machine learning may be used in order to perceive contextual (namely, semantic, inferred) meaning of various words in the user query. Furthermore, aforementioned techniques analyse the words in the user query in order to identify contextual meaning thereof. Moreover, co-occurrence of the words in the user query may be checked. Furthermore, co-occurrence of words present in the user query refers to use of the aforementioned words of the user query together in order to convey information. Furthermore, the processing module may consider the co-occurring words a singular query segment. Additionally, optionally, the processing module is operable to refine the user query by employing the aforesaid algorithm. Furthermore, the processing module employs learning and/or a data mining technique on the user query in order to refine the user query to obtain the search query.

As mentioned previously, the method for parsing the user query comprises generating the plurality of strings for the obtained search query, wherein the plurality of strings comprises the at least one query segment. Specifically, the processing module is operable to generate the plurality of strings for the obtained search query.

Throughout the present disclosure, the term "plurality of strings" used herein relates to a set of strings, wherein each string comprises at least one query segment. It will be appreciated that the plurality of strings may comprise one query segment, two query segments, three query segments and so forth. Notably, the plurality of strings having two or more query segments are generated using consecutive query segments. In operation, the plurality of query segments of the search query are analysed. Thereafter, the plurality of strings are generated for the search query.

In an example, the obtained search query may comprise "cure for cancer". In such an example, the processing module analyses the search query "cure for cancer" and generates plurality of strings. In this case, since number of plurality of base entity unit is three ("cure", "for" and "cancer"), the number of plurality of strings are six. The plurality of strings generated are "cure for cancer", "cure for", "for cancer", "cure", "for" and "cancer".

In another example, the obtained search query may comprise "top drugs for cancer". In such an example, the processing module analyses the search query "top drugs for cancer" and generates plurality of strings. In this case, since number of query segments is four ("top", "drugs", "for" and "cancer"), the number of plurality of strings are 10. The plurality of strings generated are "top drugs for cancer", "top drugs for", "drugs for cancer", "top drugs", "drugs for", "for cancer", "top", "drugs", "for" and "cancer".

Furthermore, optionally, the plurality of strings for the obtained search query is generated based on an n-gram model. It will be appreciated that the n-gram model relates to a contiguous sequence of 'n' items from a given search query, wherein 'n' represents number of query segments within each of the plurality of strings. In this regard, the string having one query segment is referred as unigram or one-gram, the string having two query segments are referred as bigram or two-gram, the string having three query segments are referred as trigram or three-gram. Similarly, based on the number of the query segments, the plurality of strings is referred as "four-gram", "five-gram", and so on.

For the sake of clarity, the above-mentioned example is explained below with respect to the n-gram model. In the aforementioned example, the plurality of strings generated may be "top drugs for cancer", "top drugs for", "drugs for cancer", "top drugs", "drugs for", "for cancer", "top", "drugs", "for" and "cancer". In such an example, the string "top drugs for cancer" is the four-gram. Similarly, the strings "top drugs for", and "drugs for cancer" could be the trigram or three-gram, the strings "top drugs", "drugs for", and "for cancer" could be bigram or two-gram and the strings "top", "drugs", "for" and "cancer" could unigram or one-gram.

As mentioned previously, the method for parsing the user query comprises sorting the plurality of strings in the decreasing order of length of the plurality of strings; the length of a string corresponds to a number of query segments in the string. Specifically, the processing module is configured to sort the plurality of strings. Furthermore, the plurality of strings is sorted to arrange the plurality of strings in a specific order. Moreover, the plurality of strings is sorted based on a specific criterion of decreasing order of the length of the plurality of strings. Examples of sorting algorithms used for sorting the plurality of strings includes at least one of: Bubble sort, Insertion Sort, Selection sort, Quick sort, Merge sort. It is to be understood that the sorting algorithm are employed in a manner such that the plurality of strings is sorted in decreasing order of the length of the plurality of strings.

In an embodiment, the plurality of strings of same length are sorted based on alphabetical order. In another embodiment, the plurality of strings of same length are sorted based on reverse alphabetical order. In yet another embodiment, the plurality of strings of same length are grouped together in a random order.

Optionally, sorting the plurality of strings comprises segmenting the plurality of strings into at least one segment based on the length of the plurality of strings, wherein each segment comprises at least one string of a specific length.

Furthermore, the at least one segment is arranged in a decreasing order based on length of the segment.

The length of a string corresponds to the number of query segments in the string. For example, the plurality of strings comprises three strings (namely, a first string, a second string and a third string). In such an example, the first string, the second string and the third string may comprise three query segments, two query segments and one query segment respectively. In such a case, the length of the first string, the second string and the third string could be three, two and one respectively. In this regard, when sorted, the first string is arranged firstly and the second string is arranged after the first string. Similarly, the third string is arranged after the second string.

As mentioned previously, the method for parsing the user query comprises assigning the part-of-speech tag to each of the query segments of the plurality of strings based on the ontology. Specifically, the processor is configured to assign the part-of-speech tag to each of the query segments based on the ontology.

Throughout the present disclosure, the term "part-of-speech tag" used herein relates to a label assigned to the query segment in the search query corresponding to a particular part of speech, based on both its definition and its context. It will be appreciated that part-of-speech tag is assigned to the query segment in accordance with corresponding syntactic properties. Examples of the parts-of-speech are noun, pronoun, adjective, determiner, verb, adverb, preposition, conjunction, numerals, and interjection.

As mentioned in the previous example, the plurality of strings comprises "top drugs for cancer", "top drugs for", "drugs for cancer", "top drugs", "drugs for", "for cancer", "top", "drugs", "for" and "cancer". In such an example, the processor analyses the sorted plurality of string for assigning the part of speech tag thereto. The first query segment "top" is identified as an adjective, the second query segment "drugs" is identified as a common noun. Similarly, the third query segment "for" and the fourth query segment and "cancer" are identified as preposition and proper noun respectively. Thereafter, the identified part-of-speech tag is labelled to the corresponding query segment. The query segment "top" is labelled as "JJ"; "drugs" is labelled as "NNS", query segment "for" is labelled as "IN", query segment "Cancer" is labelled as "NNP". It will be appreciated that the labels "JJ", "NNS", "IN", "NNP" are short forms of the adjective, common noun, preposition and proper noun respectively. Furthermore, various other labels are employed for tagging the query segments corresponding to different parts-of-speech.

In another example, the plurality of strings may comprise "top drugs for curing cancer", "top drugs for curing", "drugs for curing cancer", "top drugs for", "drugs for curing", "for curing cancer", "top drugs", "drugs for", "for curing", "curing cancer", "top", "drugs", "for", "curing" and "cancer". In such an example, the processor analyses the sorted plurality of strings for assigning the part of speech tag thereto. The first query segment "top" is identified as an adjective, the second query segment "drugs" is identified as a common noun and the third query segment "for" is identified as a preposition. Similarly, the fourth query segment "curing" is identified as a verb and the fifth query segment "cancer" is identified as proper noun respectively. Thereafter, the identified part-of-speech tag is labelled to the corresponding query segment. The query segment "top" is labelled as "JJ"; second query segment "drugs" is labelled as "NNS", third query segment "for" is labelled as "IN", fourth query segment "curing" is labelled as "VBN" and the fifth query segment "cancer" is labelled as "NNP".

Throughout the present disclosure, the term "ontology" relates to a set of concepts (namely, information, ideas, data, semantic associations and so forth) in a field (namely, subject area, domain and so forth) that comprises entity types and properties of the set of concepts and semantic association thereof. Moreover, ontology provides a structured, optimal and relevant set of concepts pertaining to the user's field of interest. Furthermore, the ontology may be used in scientific research, academic studies, market analysis and so forth. Optionally, the ontology may include concepts in form of text, image, audio, video, or any combination thereof. Additionally, the ontology may provide information on how a certain concept in a certain field may be associated with one or more concept in multiple fields.

Throughout the present disclosure, the term "database arrangement" as used herein relates to an organized body of digital information regardless of the manner in which data or an organized body thereof is represented. Optionally, the database arrangement may be hardware, software, firmware and/or any combination thereof. Furthermore, the database arrangement refers to the software program for creating and managing one or more databases. Optionally, the database arrangement is operable to supports relational operations, regardless of whether it enforces strict adherence to the relational model, as understood by those of ordinary skill in the art. Furthermore, the database arrangement is operable to store the ontology.

Optionally, the ontology is developed using at least one curated database by: applying conceptual indexing to plurality of entity units stored in the at least one curated database; identifying semantic associations, between the plurality of entity units, established in the at least one curated database; and identifying at least one class tagged with the plurality of entity units in the at least one curated database.

Optionally, field of the at least one curated database is related to the developed ontology. Specifically, the at least one curated database may comprise information providing details on associations between a plurality of concepts. Additionally, the ontology is developed to include relevant information extracted from the at least one curated database pertaining to the field of user's interest. Optionally, the at least one curated database includes information in form of text, image, audio, video, or any combination thereof.

In an example, at least one curated database may comprise information related to biomedical entities, genes, proteins, drugs, diseases, species, pathways, biological processes, molecular functions, side effects, drug labels, clinical trial parameters, patient demographics and many other semantic types thereof. Furthermore, the at least one curated database may be extracted to build a Life Science ontology (including custom dictionary and metathesaurus) containing synonyms, derivational and functional form of different biomedical entities as well as Medical Subject Headings (MeSH). Furthermore, optionally, the at least one curated database and ontology extracted from thereof may include data about authors, geography and other biological and non-biological entities.

In an embodiment, developing an ontology using at least one curated database comprises applying conceptual indexing to data-records stored in the at least one curated database, wherein the data-records may include a plurality of data-units. Optionally, conceptual indexing may include parsing of plurality of data-units of the at least one curated database. Furthermore, parsing may generate one or more conceptual structure representing assembly of the plurality of data-units to construct a relation therebetween. Moreover, conceptual indexing may be applied to data-records to identify contextual meaning thereof. Beneficially, data-records may be organized based on conceptual indexing thereof. Optionally, data-records may be a set of information related to an entity, object and so forth. Furthermore, each individual piece of information about the object and so forth may form a data-unit. In an example, at least one curated database may include information related to books, author name, publication and so forth. Furthermore, data-records stored in the at least one curated database may include information about one or more books. Moreover, data-records corresponding to one or more books may include data units pertaining to the one or more books (namely, book name, author name, publication and so forth).

In an embodiment, developing an ontology using at least one curated database comprises identifying semantic associations between the plurality of data-units, established in the at least one curated database. Furthermore, associations (namely relations, links and so forth) among the plurality of data-units may be identified based on the conceptual indexing applied to data-records stored in the at least one curated database. Beneficially, identifying semantic associations provide contextual (namely, inferred) relationships of the plurality of data-units. Optionally, the semantic associations established in the at least one curated database are identified using at least one of: knowledge-based text mining, natural language processing. Furthermore, knowledge-based text mining provides semantic association between the plurality of data-units based on identifying and analysing known information and associations.

As mentioned previously, the method for parsing the user query comprises identifying the at least one of the query segments as the at least one output class or the at least one input class based on the assigned part-of-speech tags. Specifically, the processor is configured to identify the at least one of the query segments as the at least one output class or the at least one input class based on the assigned part-of-speech tags.

Throughout the present disclosure, the term "at least one input class" used herein relates to a category of query segments associated with a narrow scope within the search query. It will be appreciated that the narrow scope is determined based on the part-of-speech tags assigned to the query segments.

Throughout the present disclosure, the term "at least one output class" used herein relates to a category of query segments having a broader scope than at least one input class within the search query. Notably, if the search query comprises only one class, that class is identified as the output class. It will be appreciated that the common noun represents a general type of a particular entity whereas the proper noun represents a specific name or information of an entity.

In one embodiment, when the at least one of the query segments are identified as the at least one output class, the identified query segments are chunked from the string with a maximum length. Thereafter the string with the maximum length is further analysed based on the part-of-speech tag. Notably, the processor search for a noun phrase in the chunked string and if a noun phrase is found, it is identified as the input class.

In an example, the search query may comprise "drugs for curing lung cancer". In such an example, plurality of strings are generated for the search query, wherein the generated plurality of strings are "drugs for curing lung cancer", "drugs for curing lung", "for curing lung cancer", "drugs for curing", "for curing lung", "curing lung cancer", "drugs for", "for curing", "curing lung", "lung cancer", "drugs", "for", "curing", "lung" and "cancer". In such an instance, the string "drugs" is identified as common noun. In such an example, the string "drugs" have a broader scope than the string "lung cancer", therefore is identified as the output class. Thereafter, the query segment "drugs" is removed from the string "drugs for curing lung cancer". The chunked string represents "for curing lung cancer". The chunked string is further analysed to determine the input class. In such a case, the query segment "lung cancer" is identified as proper noun and is determined to be the input class.

Optionally, the method further comprises extracting metadata from the plurality of strings. More optionally, the metadata is determined as a part of the at least one input class. In an example, the search query comprises "interventions used for indication lung cancer". "Interventions" is labelled as the noun, "used" is identified as the verb, "for" is identified as preposition, "indication" and "lung cancer" are identified as the nouns. Thereafter, the query segment "Interventions" is the output class. The search query is then chunked to remove the query segment "interventions" therefrom. The chunked search query now comprises "used for indication lung cancer". In such a case, the query segment "indications" is determined as the input class, wherein, the query segment "lung cancer" is determined to be an attribute of the input class. Beneficially, such determination of attribute of the input class allows for accurate interpretation of the search query.

As mentioned previously, the method for parsing the user query comprises establishing semantic associations between the query segments based on the ontology. Furthermore, the query segments are associated together based on contextual meaning thereof. Beneficially, the association of the query segments provides a notion regarding inferred meaning of the user query. The semantic associations between the query segments are based on the context of the metadata, at least one input class and the output class. Furthermore, the processing module is operable to establish semantic associations between the query segments based on the ontology.

Optionally, the method further comprises retrieving the at least one context-based data-record from the search database based on the identified at least one output class or the at least one input class associated with the query segments. Furthermore, the at least one context-based data-record is retrieved (namely, accessed) based on inferred (namely, conceptual, contextual and so forth) meaning of the query segments. Beneficially, retrieval of the at least one context-based data-record based on inferred meaning of the query segments provides an optimal (namely, best-fit, appropriate and so forth) result corresponding to the user query. Furthermore, the processing module is operable to retrieve the at least one context-based data-record from the search database based on: the query segments. The processing module is operable access the database arrangement and retrieve data-records based on semantic meaning thereof. Furthermore, the data-records having a relevant context with the query segments are retrieved (namely, accessed). Moreover, the identified at least one output class or the at least one input class provide a definite notion regarding context of the query segments. Beneficially, the context of the query segments provides an appropriate inference of the user query. Furthermore, the identified at least one output class or the at least one input class associated with the query segments narrow the context-based search to inferred meaning of the identified classes. Moreover, the processing module is operable to retrieve the at least one context-based data-record from the search database based on the identified at least one output class or the at least one input class associated with the query segments. Additionally, the processing module is operable to analyse the at least one context-based data-record and identify significance thereof corresponding to the identified input and output classes associated with the query segments.

Furthermore, optionally, retrieving the at least one context-based data-record is based on the established semantic associations between the query segments. Furthermore, the associations between the query segments aids contextual analysis of the user query. Beneficially, the semantic associations between the query segments provide inferred meaning of the user query. Consequently, the context-based search generates most optimal result for the user query by extracting data blocks from the search database. Furthermore, the processing module is operable to retrieve the at least one context-based data-record based on: the established semantic associations between the query segments. Beneficially, the processing module is operable to identify the semantic (namely, contextual) association between the query segments. Consequently, exact notion of context of the user query is perceived by the processor.

Optionally, the at least one output class comprises a first and second output class, and wherein the method further comprises performing a hierarchy analysis on the first and second output class. The processor is configured to perform the hierarchy analysis on the first and second output class. The hierarchy analysis facilitates determination of the class with broader and narrow scope among the first and the second output class. Optionally, the hierarchy analysis is performed based on the ontology. More optionally, the hierarchy records of various entity types are predefined and are stored in the database arrangement.

Optionally, the processor is configured to generate a hierarchical database model for the first output class and the second output. Notably, the query segments in the first and the second output class are organized into a tree-like structure, wherein the query segments in the first and the second output class are connected via nodes. Optionally, the at least one output class may comprise more than two output classes, wherein the hierarchy analysis is performed on each of the output classes Optionally, in this regard, the at least one context-based data-record is extracted based upon the output class with lower hierarchy. In an example, the search query may comprise "patents and publications for curing cancer". In such an example, the query segments "publications" and "patents" are identified as the first and second output class, respectively. The processor is configured to perform the hierarchy analysis on the first and second output classes by generating the hierarchical database model. Based on the hierarchical database model, the processor determines that the first output class have lower hierarchy than the second output since class each patent is a publication however, each publication is not always a patent. Therefore, the at least one context-based data-record is extracted based upon the first output class.

Optionally, when the at least one output class comprises first and second output class, the strings with the maximum length is processed. In such a case, the part-of-speech tags of each query segments are analysed. In this regard, if the part-of-speech tags of the query segments, between the two output classes, are preposition and/or verb, the first output class (such as the query segment positioned before the query segment having preposition or a verb part-of-speech tag) is determined at a main output class. In an example, the search query may comprise "Interventions used for indication lung cancer". The part-of-speech tags are assigned to each of the query segments. "Interventions" is labelled as the noun, "used" is identified as the verb, "for" is identified as preposition, "indication" and "lung cancer" are identified as the nouns. In such an example, the query segments "intervention" and "indication" are identified as the first output class and the second output class, respectively. The processor analyses the query segments between the first and second output classes and determines that the query segment present therebetween are tagged as "verb" and "preposition". In such a case, the processor determined that the first output class is the main output class that is to be further processed.

Optionally, the at least one context-based data-record is extracted based upon the first and second output classes when the first and second output classes are at same hierarchy. In an example, the search query may comprise "drugs in patents for lung cancer". In such an example, the query segments "drugs" and "patents" are identified as the first and second output class. The processor is configured to perform the hierarchy analysis on the first and second output classes by generating the hierarchical database model. Based on the hierarchical database model, the processor determines that the first output class has same hierarchy as the second output class. Therefore, the at least one context-based data-record is extracted based upon the first output class and the second output class.

Furthermore, optionally, the method for parsing the user query further comprises processing the plurality of strings to identify additional units. It will be appreciated that the additional unit relates to query segments having comparative context. Examples of such additional unit may include, but not limited to, TOP, rarely used, mostly used, frequently used, numerals (for example such as 1, 2, 3, and so on). Optionally, if the additional unit are numerals, these additional units having numeral values are converted into word text. Such additional unit may be predefined and stored in a curated database. Furthermore, the meaning of the special character, such as ">" (greater than), "<" (less than), "+" (or), "&" (and) and so forth, are stored in the curated database. Such meaning of the special characters allows the processor to understand the user query more efficiently and accurately.

In an example, the search query may comprise "top 10 publications for engines". The plurality of strings generated are "top 10 publications for engines", "top 10 publications for", "10 publications for engines", "top 10 publications", "10 publications for", "publications for engines", "top 10", "10 publications", "for engines", "top", "10", "publications", "for" and "engines". The plurality of strings are arranged in decreasing order of length of the query segments. Thereafter, the strings are analysed to determine "publication" as the output class, "for" is determined as the metadata and "engines" are determined as the input class, based on the part-of-speech tag. In such an example, the string "top 10" is determined as the additional unit. The processor interprets the context of the additional unit and the metadata with respect to the input and the output class. Based on the context of the additional unit and the metadata with respect to the input and the output class, the processor retrieves the at least one context-based data.

In the aforementioned example, the at least one context-based data is retrieved based on the ten most viewed publications. In another example, the at least one context-based data is retrieved based on 10 top rated publications.

In an embodiment, in the method for parsing the user query, context of the additional units with respect to the at least one query segment is defined based on position of the additional units in the search query. In such an embodiment, a count algorithm is employed to determine the position of each word in the query segment. Once the additional unit is identified, the count algorithm is configured to determine the position of the additional unit in the search to define the context. In an example, if the search query comprises "drugs except tablets for cough", in such a case string drugs" and "tablets" are the output classes and the string "cough" is input class. In such a case, the string "except" is the additional unit. Subsequently, position of the string "drugs" in the search query is determined as <starting position=0> and <ending position=4>, similarly, the position of the string "tablets" is determined as <starting position=13> and <ending position=19>. In such an example, the position of the string (additional unit) "except" is determined as <starting position=6> and <ending position=11>. The processor determines that the string "except" has a negative meaning and is placed in between the "drugs" and "tablets". Therefore, the context of the additional unit is determined as the user only want those drugs that are not tablet for curing cough, thereby providing an accurate context-based data-record.

Furthermore, there is disclosed computer readable medium containing program instructions for execution on a computer system, which when executed by a computer, cause the computer to perform method steps for parsing a user query. The method comprises the steps of receiving the user query; refining the user query to obtain a search query using an algorithm, wherein the search query comprises query segments; generating a plurality of strings for the obtained search query, wherein the plurality of strings comprise at least one query segment; sorting the plurality of strings in a decreasing order of length of the plurality of strings, the length of a string corresponds to a number of query segments in the string; assigning a part-of-speech tag to each of the query segments of the plurality of strings based on an ontology; identifying at least one of the query segments as at least one output class or at least one input class based on the assigned part-of-speech tags; and establishing semantic associations between the query segments based on the ontology to obtain the parsed user query.

Optionally, the computer readable media comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1:
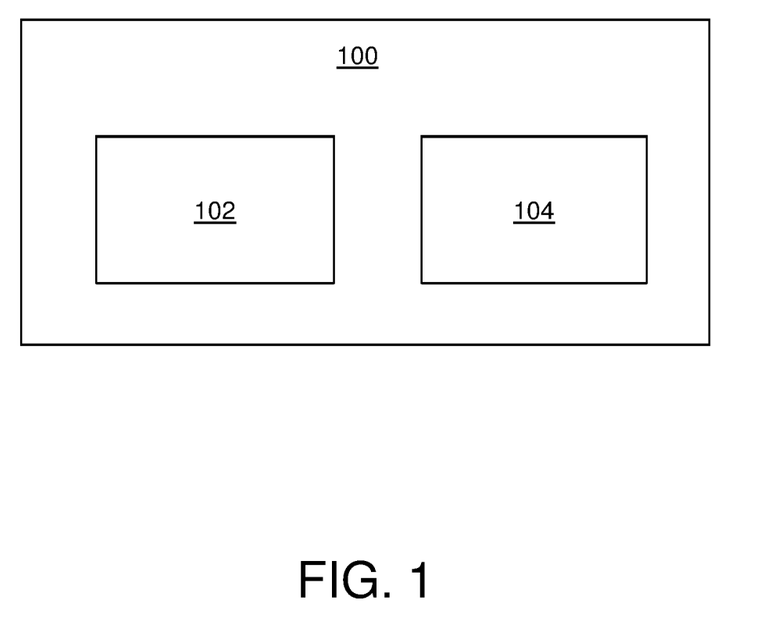
FIG. 1 is a block diagram of a system that parses a user query, in accordance with an embodiment of the present disclosure.

Referring to FIG. 1, illustrated is a block diagram of a system 100 that parses a user query, in accordance with an embodiment of the present disclosure. The system 100 comprises a database arrangement 102 operable to store an ontology; a processing module 104 communicably coupled to the database arrangement 102. The processing module 104 is operable receive the user query and obtain a parsed user query based on the ontology.

Figure 2:
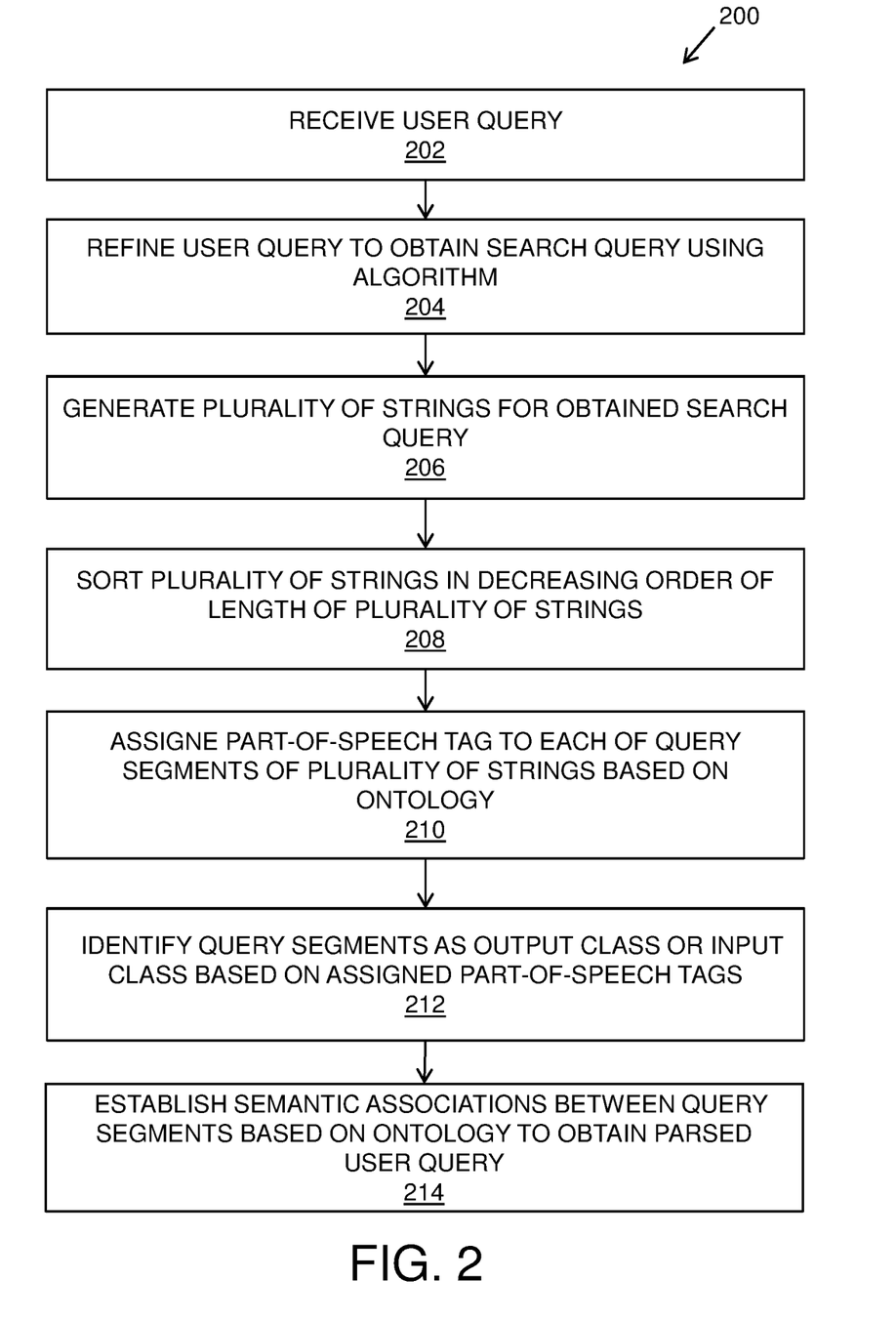
FIG. 2 is an illustration of steps of a method for parsing a user query, in accordance with an embodiment of the present disclosure.

Referring to FIG. 2, illustrated are steps of a method 200 for parsing a user query, in accordance with an embodiment of the present disclosure. At a step 202, the user query is received. At a step 204, the user query is refined to obtain a search query using an algorithm, wherein the search query comprises query segments. At a step 206, a plurality of strings are generated for the obtained search query, wherein the plurality of strings comprise at least one query segment. At a step 208, the plurality of strings are sorted in a decreasing order of length of the plurality of strings, wherein the length of a string corresponds to a number of query segments in the string. At a step 210, a part-of-speech tag is assigned to each of the query segments of the plurality of strings based on an ontology. At a step 212, at least one of the query segments is identified as at least one output class or at least one input class based on the assigned part-of-speech tags. At a step 214, semantic associations are established between the query segments based on the ontology to obtain the parsed user query.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system configured to parse a user query to retrieve a data record from a search database, wherein the system includes a computer system, wherein the computer system comprises:
    a memory configured to store an ontology; and
    a processor communicably coupled to the memory, the processor being configured to:
        receive the user query;
        refine the user query to obtain a search query using an algorithm, wherein the search query comprises query segments, wherein the algorithm checks a co-occurrence of words in the user query and wherein the co-occurrence of words is considered a singular query segment;
        generate a plurality of strings for the obtained search query, wherein the plurality of strings comprises at least one query segment, and wherein a plurality of strings having two or more query segments are generated using consecutive query segments;
        sort the plurality of strings in a decreasing order of length of the plurality of strings, wherein a length of a string corresponds to a number of query segments in the string;
        assign a part-of-speech tag to each of the query segments of the plurality of strings based on the ontology, wherein the part-of-speech tag comprises at least one of: a proper noun, a common noun, a pronoun, an adjective, a determiner, a verb, an adverb, a preposition, a conjunction, numerals and an interjection;
        identify at least one of the query segments as at least one output class based on the assigned part-of-speech tag, wherein the at least one of the query segments identified as the at least one output class is associated with a broader scope, wherein the broader scope associated with the at least one of the query segments is determined based on the common noun comprised in the assigned part-of-speech tag;
        generate a chunked string by removing the at least one of the query segments identified as the at least one output class from a string of the plurality of strings, with a maximum length;
        determine the at least one of the query segments as at least one input class based on the generated chunked string, wherein the at least one of the query segments identified as the at least one input class is associated with a narrow scope within the obtained search query, wherein the narrow scope associated with the at least one of the query segments is determined based on the proper noun comprised in the assigned part-of-speech tags;
        establish semantic associations between query segments identified as at least one output class and at least one input class, based on the ontology to obtain the parsed user query; and
        retrieve at least one context-based data-record based on at least one of:
            the identified at least one output class and the identified at least one input class associated with the query segments; and
            the established semantic associations between the query segments identified as the at least one output class and the at least one input class.

2. The system of claim 1, wherein the algorithm used in refining the user query comprises at least one of: natural language processing, text analytics and machine learning techniques.

3. A method for parsing a user query to retrieve a data record from a search database, wherein the method is implemented via a computer system which comprises a memory, wherein the method comprises:
    receiving the user query;
    refining the user query to obtain a search query using an algorithm, wherein the search query comprises query segments, wherein the algorithm checks a co-occurrence of words in the user query and wherein the co-occurrence of words is considered a singular query segment;
    generating a plurality of strings for the obtained search query, wherein the plurality of strings comprises at least one query segment, and wherein a plurality of strings having two or more query segments are generated using consecutive query segments;
    sorting the plurality of strings in a decreasing order of length of the plurality of strings, wherein a length of a string corresponds to a number of query segments in the string;
    assigning a part-of-speech tag to each of the query segments of the plurality of strings based on an ontology stored in the memory, wherein the part-of-speech tag comprises at least one of: a proper noun, a general noun, a pronoun, an adjective, a determiner, a verb, an adverb, a preposition, a conjunction, numerals and an interjection;
        identifying at least one of the query segments as at least one output class based on the assigned part-of-speech tags, wherein the at least one of the query segments identified as the at least one output class is associated with a broader scope, wherein the broader scope associated with the at least one of the query segments is determined based on a common noun comprised in the assigned part-of-speech tags;
        generating a chunked string by removing the at least one of the query segments identified as the at least one output class from a string, of the plurality of strings, with a maximum length;
        determining the at least one of the query segments as at least one input class based on the generated chunked string, wherein the at least one of the query segments identified as the at least one input class is associated with a narrow scope within the search query, wherein the narrow scope associated with the at least one of the query segments is determined based on the proper noun comprised in the assigned part-of-speech tags;
    establishing semantic associations between query segments identified as the at least one output class and the at least one input class based on the ontology to obtain the parsed user query; and
    retrieving at least one context-based data-record from the search database based on at least one of:
        the identified at least one output class and the at least one input class associated with the at least one of the query segments; and
        the established semantic associations between the at least one of the query segments identified as the at least one output class and the at least one input class.

4. The method of claim 3, wherein the at least one output class comprises a first and second output class, and wherein the method further comprises performing a hierarchy analysis on the first and second output class.

5. The method of claim 4, wherein the at least one context-based data-record is extracted based upon the first and second output class with lower hierarchy.

6. The method of claim 4, wherein the at least one context-based data-record is extracted based upon the first and second output class when the first and second output class are at same hierarchy.

7. The method of claim 3, wherein the method further comprises extracting metadata from the plurality of strings.

8. The method of claim 3, wherein the method comprises developing the ontology using at least one curated database by:
   applying conceptual indexing to a plurality of entity units stored in the at least one curated database;
   identifying semantic associations, between the plurality of entity units established in the at least one curated database; and
   identifying at least one class tagged with the plurality of entity units in the at least one curated database.

9. The method of claim 3, wherein the algorithm used in refining the user query comprises at least one of: natural language processing, text analytics and machine learning techniques.

10. A non-transitory computer readable storage medium, containing program instructions for execution on a computer system comprising a memory, which when executed by the computer system cause the computer system to perform method steps for parsing a user query to retrieve a data record from a search database, the method comprising the steps of:
   receiving the user query;
   refining the user query to obtain a search query using an algorithm, wherein the search query comprises query segments, wherein the algorithm checks a co-occurrence of words in the user query and wherein the co-occurrence of words is considered a singular query segment;
   generating a plurality of strings for the obtained search query, wherein the plurality of strings comprises at least one query segment, and wherein a plurality of strings having two or more query segments are generated using consecutive query segments;
   sorting the plurality of strings in a decreasing order of length of the plurality of strings, herein a length of a string corresponds to a number of query segments in the string;
   assigning a part-of-speech tag to each of the query segments of the plurality of strings based on an ontology stored in the memory, wherein the part-of-speech tag comprises at least one of: a proper noun, a common noun, a pronoun, an adjective, a determiner, a verb, an adverb, a preposition, a conjunction, numerals and an interjection;
      identifying at least one of the query segments as at least one output class based on the assigned part-of-speech tags, wherein the at least one of the query segments identified as the at least one output class is associated with a broader scope, wherein the broader scope associated with the at least one of the query segments is determined based on the common noun comprised in the assigned part-of-speech tags;
      generating a chunked string by removing the at least one of the query segments identified as the at least one output class from a string of the plurality of strings, with a maximum length;
      determining the at least one of the query segments as at least one input class based on the generated chunked string, wherein the at least one of the query segments identified as the at least one input class is associated with a narrow scope within the search query, wherein the narrow scope associated with the at least one of the query segments is determined based on the proper noun comprised in the assigned part-of-speech tags;
   establishing semantic associations between query segments identified as the at least one output class and the at least one input class, based on the ontology to obtain the parsed user query; and
   retrieving at least one context-based data-record from the search database based on at least one of:
      the identified at least one output class or the at least one input class associated with the at least one of the query segments; and
      the established semantic associations between the at least one of the query segment identified as the at least one output class and the at least one input class.

* * * * *